United States Patent Office 2,953,571
Patented Sept. 20, 1960

2,953,571

PYRAZOLOPYRIDINES

Heinz Schulze, Cincinnati, Ohio, assignor to General Aniline & Film Corporation, New York, N.Y., a corporation of Delaware No Drawing. Filed Dec. 13, 1957, Ser. No. 702,545

14 Claims. (Cl. 260—294.8)

This invention relates to pyrazolopyridines and a process for preparing them.

It is known to prepare pyrazolopyridines containing at least one OH group in the pyridine ring by condensing 3-amino-1-aryl-5-pyrazolones with β-ketoesters. Such a reaction was described by Lasker and Ghosh, Science and Culture II, 5061 (1945), wherein 3-amino-1-phenyl-5-pyrazolone was condensed with ethyl acetoacetate in ethyl alcohol in the presence of sodium ethylate as a basic catalyst. In this reaction, ethyl alcohol is eliminated from between the amino group of the pyrazolone and the ethoxy group of the ethyl acetoacetate to produce ethyl β-(3-amino-1-phenylpyrazolone) crotonate. The resulting crotonic ester is then treated with additional sodium ethylate in ethyl alcohol whereby water is split out to produce a pyrazolopyridine believed to have the following structure:

I.

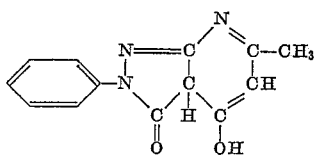

The above condensations may also be performed in one step by reacting ethyl acetoacetate or ethyl benzoylacetate and 5-imino-1-phenyl-5-pyrazolidinone in acetic acid according to Papini and Venturini, Gazz. Chim. Ital. 83, 861–6 (1953).

In another reference, U.S.P. 2,584,314, it is disclosed that 3-amino-1-aryl-5-pyrazolones react with dialkyl malonates in the presence of sodium methylate and alcohol to yield compounds of the following formula:

II.

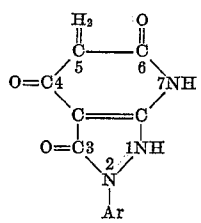

wherein Ar represents an aryl group.

It is to be understood that the keto groups can undergo enolization resulting in a hydroxy group at the 4- and 6-position.

Since pyrazolopyridines are valuable chemical intermediates useful as dyestuff intermediates, ultraviolet absorbers, stabilizers, and the like, it is evident that a need exists in the art for obtaining pyrazolopyridines of more diverse structure and properties.

I have now discovered that pyrazolopyridines, without OH (or keto) groups in the pyridine ring, can generally be prepared by heating a 3-amino-1-aryl-5-pyrazolone with a 1,3-diketone.

The resulting pyrazolopyridines prepared by my new method are new entities and differ from compounds of the prior art in that the pyrazolopyridines described herein do not contain hydroxyl or keto groups in the pyridine ring.

It is, therefore, the purpose and object of the present invention to provide the aforesaid new entities and a method of preparing same.

The 1,3-diketones, which I employ in practicing my invention, can be represented by the following general formula:

III.

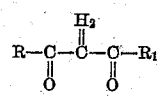

wherein R and $R_1$ can be alkyl, i.e., methyl, ethyl, propyl, n-propyl, n-butyl, n-amyl, isoamyl, hexyl, heptyl, octyl, nonyl, decyl, dodecyl, tridecyl, myristyl, pentadecyl, palmityl, margaryl, stearyl, etc.; aryl, i.e., phenyl, halophenyl, e.g., chlorophenyl, dichlorophenyl, trichlorophenyl; α- and β-naphthyl, etc.; and heterocyclic radicals, i.e., pyridyl, thienyl and furyl.

Typical 1,3-diketones which can serve as intermediates that will react with 3-amino-1-aryl-5-pyrazolones are the following:

2,4-pentanedione
1-phenyl-1,3-butanedione
4,4,4-trifluoro-1-(2-thienyl)-1,3-butanedione
1-(2-thienyl)-1,3-butanedione
1-(2-furyl)-1,3-butanedione
1-(2-pyridyl)-1,3-butanedione
4,4,4-trifluoro-1-(2-furyl)-1,3-butanedione
4,4,5,5,6,6,6-heptafluoro-1-(2-furyl)-1,3-hexanedione Of the 3-amino-1-aryl-5-pyrazolones, the following list is typical:

3-amino-1-phenyl-5-pyrazolone
3-amino-1-(2'-chlorophenyl)-5-pyrazolone
3-amino-1-(2',4',6'-trichlorophenyl)-5-pyrazolone
3-amino-1-(α-naphthyl)-5-pyrazolone
3-amino-1-(β-naphthyl)-5-pyrazolone The pyrazolones obtained from the aforesaid procedure are formed by the elimination of the two molecules of water from between the 5-pyrazolone and the 1,3-diketone and can probably be represented by one of the following general formulae:

IV A.

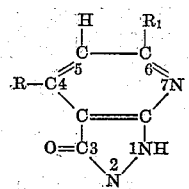

IV B.

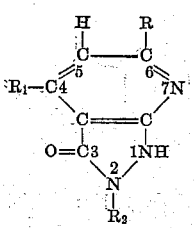

wherein $R_2$ is an aryl radical of the benzene or naphthalene series and R and $R_1$ have the values as given above.

If the 1,3-diketone component is symmetrical, e.g., 1,3-pentanedione, then the substituents in the 4- and 6-position of the resulting pyrazolopyridine will be identical; in this case, the substituents would be methyl groups. If, however, an unsymmetrical 1,3-diketone, e.g., 1-phenyl-1,3-butanedione, is reacted with a 3-amino-1-aryl-5-pyrazolone, it is possible for the reaction to yield two isomeric structures as depicted in Formulae IV A. and IV B., differing with respect to the orientation of R and $R_1$ which can be either methyl or phenyl. The particular pyrazolopyridine obtained, whether structure IV A. or IV B., depends on which of the keto groups, i.e., either the 1- or 3-keto group of the 1,3-diketone, reacts first with the 3-amino-1-aryl-5-pyrazolone. In both instances, of course, two molecules of water are eliminated.

It is to be understood that the above theoretical interpretation as to the mechanism of these reactions is merely offered as a tentative postulation and as such are not to be construed as imposing any limitations on this invention.

It should be noted that the pyrazolopyridines described herein are capable of existing at least partially in different tautomeric forms and such tautomeric forms or structures are to be taken as falling within the scope of my invention.

The system of numbering as employed herein is that given for pyrazolopyridine ring structure in "The Ring Index," by Patterson and Capell, Reinhold Publishing Corporation (1940), No. 762.

In accordance with my invention, I prepare pyrazolopyridines by heating a 3-amino-1-aryl-5-pyrazolone with a 1,3-diketone of the type depicted above, the temperature ranging from 80° C. to 130° C. and from 2 to 24 hours.

The reaction can be carried out either in the presence or absence of any solvent. In some instances, it may be advantageous to employ an excess of 1,3-diketone as a solvent, e.g., 1,3-butanedione, which is a liquid at ordinary room temperature. Other solvents that can be successfully employed include pyridine bases, aliphatic acids normally liquid at room temperature, aliphatic alcohols of from 1 to 4 carbon atoms, and water. However, the reaction is independent of any solvent system and proceeds equally well when equivalents of the 1,3-diketone and 3-amino-1-aryl-5-pyrazolone are heated together.

The following examples will serve to illustrate in greater detail my new pyrazolopyridines and a manner for obtaining the same but such examples are illustrative only and it is to be understood that my invention is to be taken as limited only to the scope of the appended claims.

Example I 8.75 grams of 3-amino-1-phenyl-5-pyrazolone, 10 ml. of acetic acid and 5.5 ml. of 2,4-pentanedione were kept on a steam bath for 16 hours. After addition of 25 ml. of water, the reaction product crystallized out on cooling. It was filtered, washed with water and recrystallized from dilute alcohol. The orange crystals melted sharply at 196–197° C.

This compound is presumed to be:

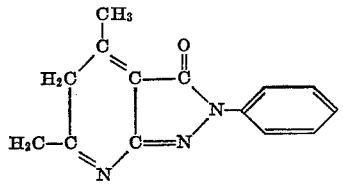

Calculated for $C_{14}H_{13}ON_3$: 70.04% C., 5.43% H., 17.6% N. Found: 70.21% C., 5.52% H., 17.62% N.

Example II 8.75 grams of 3-amino-1-phenyl-5-pyrazolone, 15 ml. of acetic acid and 8.75 g. of 1-phenyl-1,3-butanedione were kept on a steam bath for 24 hours. The dark red mixture was treated with 10 ml. of water and some acetonitrile. On cooling, the precipitate which was initially amorphous became crystalline. It consisted of a mixture of at least two compounds which were separated from acetonitrile. On cooling, Compound A crystallized in nearly colorless platelets which were filtered off and weighed 7 g.

The filtrate was kept in a refrigerator overnight after which 550 mg. of beautiful orange needles of Compound B separated out.

Compound A was recrystallized from acetonitrile and melted at 201–202° C.

Compound B melted after recrystallization from alcohol at 257–258° C.

Calculated for $C_{19}H_{15}ON_3$: 75.73% C., 5.02% H.
Found for Compound A: 75.77% C., 5.01% H.
Found for Compound B: 75.48% C., 5.13% H.

At the present time, the relationship between Compound A and Compound B is not known. It is believed, however, that one of the following formulae is the correct structure for Compound A.

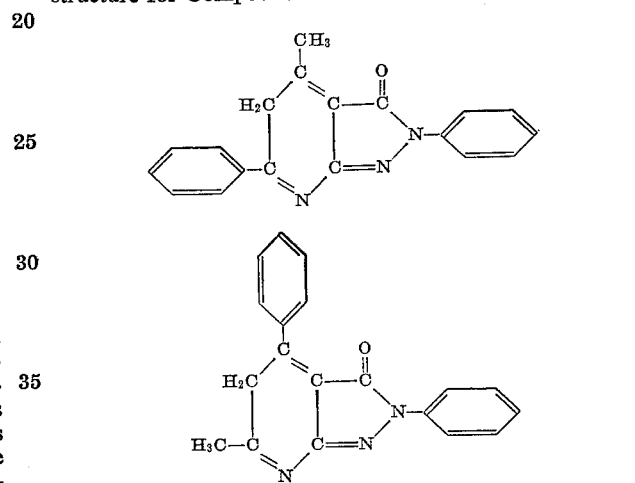

Example III 11 grams of α-thenoyl-3-trifluoro acetone, 8.75 g. of 3-amino-1-phenylpyrazolone and 15 ml. of acetic acid were heated 24 hours on a steambath. After cooling, the greenish crystalline precipitate was filtered and washed with little acetic acid. After crystallization from acetic acid, the compound melted at 217–218° C.

Calculated for $C_{17}H_{10}ON_3F_3S$: 56.50% C., 2.80% H. Found: 56.60% C., 2.92% H.

The above compound is presumed to be represented by one of the following formulae:

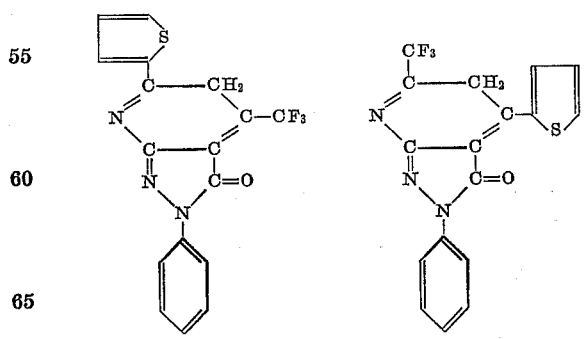

Example IV 10.4 grams (0.05 mole) furoyl trifluoroacetyl methane, 8.75 g. (0.05 mole) 3-amino-1-phenylpyrazolone and 15 ml. of acetic acid were heated on a steambath overnight. The dark brown solution separated 15 g. of a crystalline product on cooling. After recrystallization from 70% acetic acid, it melted at 201–202° C.

The resulting compound can probably be represented by one of the following formulae:

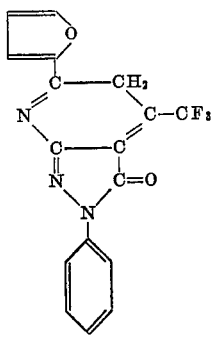 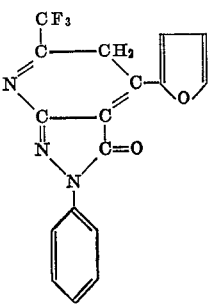

*Example V*

The same procedure was followed as in Example IV using furoyl perfluorobutyryl methane instead of the trifluoromethyl. A product was isolated which melted at 211–212° C. after recrystallization from 70% alcohol.

The structure is probably represented by one of the following formulae:

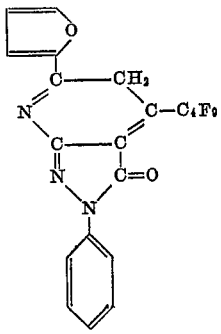 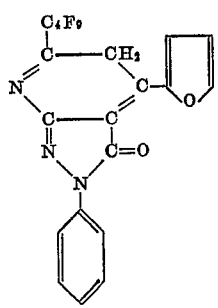

The ultraviolet absorption of the product isolated in this case corresponded very closely to that of Example IV.

I claim:

1. A pyrazolopyridine of the following general formula:

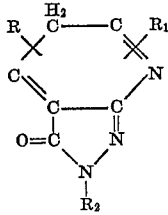

wherein R and $R_1$ each represent a member selected from the class consisting of an alkyl radical containing 1 to 20 carbon atoms, phenyl, halophenyl, naphthyl, pyridyl, thienyl and furyl, $R_2$ represents an aromatic radical selected from the class consisting of phenyl and naphthyl, said pyrazolopyridine being obtained by heating a 3-amino-1-aryl-5-pyrazolone wherein said aryl radical is selected from the class consisting of phenyl and naphthyl with a 1,3-diketone of the following general formula:

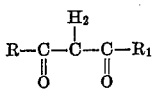

wherein R and $R_1$ each represent a member selected from the class consisting of an alkyl radical containing 1 to 20 carbon atoms, phenyl, halophenyl, naphthyl, pyridyl, thienyl and furyl and recovering said pyrazolopyridine from the reaction mixture.

2. The product as defined in claim 1 wherein R and $R_1$ are alkyl.
3. The product as defined in claim 1 wherein R is alkyl and $R_1$ is aryl.
4. The product as defined in claim 1 wherein R is alkyl and $R_1$ is pyridyl.
5. The product as defined in claim 1 wherein R is alkyl and $R_1$ is thienyl.
6. The product as defined in claim 1 wherein R is alkyl and $R_1$ is furyl.
7. The process of preparing pyrazolopyridines which comprises heating a 3-amino-1-aryl-5-pyrazolone with a 1,3-diketone of the following general formula:

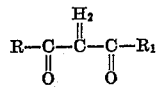

wherein R and $R_1$ are selected from the class consisting of alkyl, aryl, pyridyl, thienyl and furyl radicals and recovering said pyrazolopyridines from the reaction mixture.

8. The process according to claim 7 wherein the heating is conducted in the presence of a solvent.
9. The process as defined in claim 8 wherein the solvent is selected from the class consisting of water, lower alkanoic acids normally liquid at room temperature, lower alkanoic alcohols of from 1 to 4 carbon atoms, and heterocyclic bases of the pyridine series.
10. The process according to claim 9 wherein the solvent is acetic acid.
11. The process according to claim 9 wherein the solvent is 2,4-pentanedione.
12. The process according to claim 9 wherein the solvent is pyridine.
13. The process according to claim 9 wherein the solvent in propanol.
14. The process according to claim 9 wherein the temperature ranges from 80° C. to 130° C.

References Cited in the file of this patent

UNITED STATES PATENTS 2,584,314  Adams et al. _____ Feb. 5, 1952

OTHER REFERENCES

Lasker et al.: Chem. Abst., vol. 40, pp. 4064–5 (1946).
Papini et al.: Gazz. Chim. Ital., vol. 83, pp. 861–6 (1953).